March 26, 1957    D. J. ALLEY    2,786,291
PERPETUAL CALENDAR

Filed March 23, 1953    2 Sheets-Sheet 1

Fig. 1

Dee J. Alley
INVENTOR.

BY *Clarence A. O'Brien*
*and Harvey B. Jacobson*
Attorneys

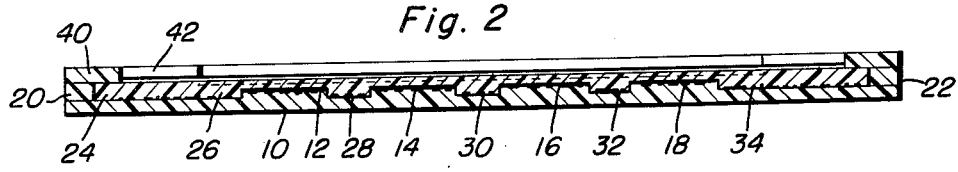
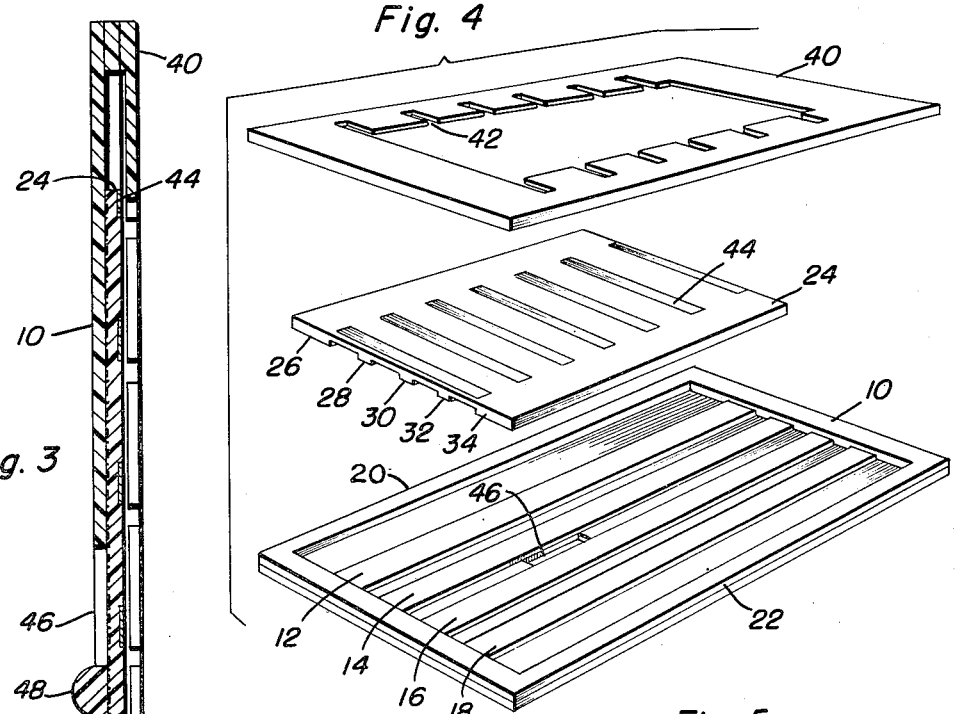
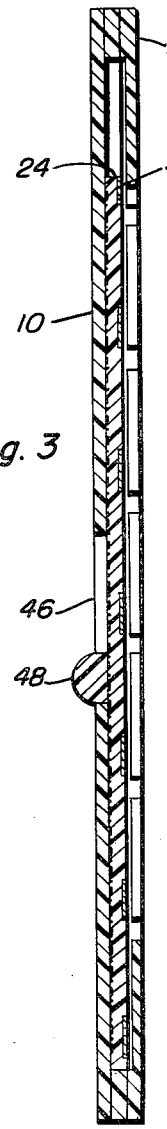
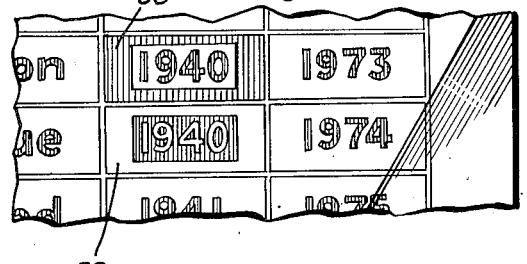

United States Patent Office 2,786,291
Patented Mar. 26, 1957

2,786,291

PERPETUAL CALENDAR

Dee J. Alley, Washington, D. C.

Application March 23, 1953, Serial No. 344,160

2 Claims. (Cl. 40—109)

This invention relates to a perpetual calendar and particularly to a compact, easily adjusted and read calendar covering a long period of years.

It has heretofore been customary to provide substantially current calendars covering one or more current years with the calendar showing the dates of the month, week, etc., of the current period and to resupply the new calendars at the end of the current period so that they remain current. However, it is frequently desirable to have available dates of other years other than the current year, either in the past or in the future, so it can be determined when some event happened or when some new event will happen, and also to have a calendar which will be a constant current calendar regardless of the passage of years.

The present calendar provides a pair of relatively movable members, one of which contains the days of the month arranged in chronological order with the months arranged in parallel vertical columns. The second member contains movable slide members associated with the first member and containing the days of the week arranged in sequence, and repeated as often as may be necessary. Also associated with this second member are the dates of the year arranged in chronological order in vertical succession with the leap years repeated in chronological succession. The first and second members being movable with respect to each other by a period equal to six days in the tabulation and a selector for pointing out the years consisting of a preferably opaque member lying over that portion of the second member on which the year dates are arranged and having slots or other arrangements by which the several years of the vertical columns can be observed.

It is accordingly an object of the invention to provide a handy perpetual calendar.

It is a further object of the invention to provide a calendar construction operative as a perpetual calendar.

It is a further object of the invention to provide a calendar in which dates, either past or present, may be determined accurately.

It is a further object of the invention to provide a calendar having a novel appearance.

Other objects and many of the attendant advantages of the present invention will be apparent from the following detailed description taken in conjunction with the accompanying drawing, in which:

Figure 1 is a plan view of the perpetual calendar with parts broken away to show the underlying portions;

Figure 2 is a cross-section through the calendar construction taken substantially on the plane indicated by the line 2—2 of Figure 1 and showing the details of the construction;

Figure 3 is a transverse section through the calendar construction taken substantially on the plane indicated by the line 3—3 of Figure 1 and showing further details of the construction;

Figure 4 is an exploded perspective of the component parts of the calendar structure; and Figure 5 is an enlarged detail of a portion of the calendar showing how the leap years dates are designated.

In a calendar construction according to the invention, a back member 10 is provided with a plurality of longitudinally extending strips 12, 14, 16, 18 and a plurality of fillers or side strips 20 and 22. Each of the strips 12, 14, 16 and 18 is provided with three columns of indicia corresponding to the days of the month. The first column on the left hand side being January, with January, February and March being shown on the upstanding portion 12 and the months of April, May and June being shown on the upstanding portion 14, with July, August and September shown on the upstanding portion 16, and October, November and December shown on the upstanding portion 18.

The operating portion of the columns 12 to 18 is 43 spaces long for simplicity of operation with the second member presently to be described. For simplicity of operation, January 1 is started in the second space in the left hand column and continues down through 31 days. The various columns being arranged in blocks of seven, February will then be so arranged that the first of February will fall opposite the fourth of January, as the first seven day groups of January expire on January 28, leaving three days over so that the first day available in February will be opposite the fourth day of January. February will be assigned leap year, or February 29, and indicia will be affixed thereto so that it will be noticeable and stand out from the other month dates. Since February normally has 28 days, the normal calendar will have the first day of March corresponding to the first day of February. However, arrangements presently to be described are available to shift the first day of March with respect to the weekdays on leap year.

A slide member 24 is provided with ribs that form depending portions 26, 28, 30, 32 and 34 which depend into the spaces between the upstanding portions 12 to 18, and the side portions 20 and 22. The depending portions 26 to 34 are likewise provided with 43 spaces, with the first space being indicated as Sunday and following in vertical sequence until Sunday again falls at the bottom of the column. While for ease of operation, five columns of weekdays have been provided on the calendar, it is obvious that only one is necessary and that the others could have been eliminated and the elevated sections 12 to 18 constructed as a single raised piece or as two raised pieces with one of the dependent portions 28 to 32 therebetween in order to eliminate the size of the calendar. The outside portions 26 and 34, while being shown as having weekdays thereon, one or both could, as has been stated, be eliminated. The year dates are arranged in vertical chronological order with leap years being repeated. It is desirable to have the first year date start with Monday on the slide sheet, and for this purpose, a year in which January 1 falls on Monday is selected. This may be done either by inspecting calendars or by a formula presently to be described. By use of the formula, it will be found that the years 1872, 1906, 1912, 1940, etc., had Monday, January 1. Consequently, one of these years is provided in side-by-side arrangement with Monday on the slide portion. Any desired number of years may be inscribed, there being 42 year dates in the vertical column. In order that the days of the week may bs shifted as desired to any point in the stationary base member, the slide member 24 is six postion spaces shorter than the hollow or depressed portions in the base 22 so that the slide 24 may move six spaces.

A cover member 40 overlies the base member and the slide member 24 and preferably, as that portion covering the columns of year dates, is substantially opaque. There are windows, slots or other portions occurring every seventh space vertically so that by sliding the slide member six paces, the entire number of year dates will shown in one or the other of the windows 42. In order to easily read the indicia in the monthly columns on the upstanding ribs 12 to 18, it is preferable that the slide member 24 be made of substantially transparent material so that the numerals may be easily read therethrough. It is desirable, also, that the divisions of the week be set forth, and for this purpose, shaded material 44 is provided corresponding to Saturday and Sunday, or to any other desired day of the week, such as Sunday only, so that the divisions between the weeks will be apparent at a glance at the calendar. Preferably the shaded portions 44 are substantially transparent so that the numerals on the underlying raised portions may be readily seen therethrough. In order to provide for the leap day or February 29, the column of year dates has been provided with double dates for leap years. The upper date being shaded so as to indicate the leap year, and the lower date being differently shaded to indicate the normal portion of the year. When utilizing the calendar on leap year, during January and February, the calendar is set at the leap year date, as shown by the shaded portion on the last year year date number, and after February 29, or leap year day, the calendar is shifted to normal year date so that the days of the week and other dates will show in their proper sequence. For manipulating the calendar, it is generally desirable to provide an aperture 46 in the base 10 and to provide a thumb engaging member 48 on the side 24 extending through the slot 46 so that the slide 24 may be positioned as desired. The following instructions are provided for finding the day of the week for any date:

Take any year desired, for example, 1952. Add the quotient of the year divided by four dropping the fraction, or plus 488; if it is a leap year, that is, divisible evenly by four, deduct one, or a minus 1; deduct the quotient of the year divided by 100, dropping the fraction, or minus 19; add the quotient of the year divided by 400, dropping the fraction, or plus 4. Total of above is 2,424. Now, divide the total by seven, and the remaining number will be the day of the week on which January 1 falls, starting with Monday as No. 1. In the present example, dividing 2,424 by 7, which gives a quotient of 346, the remainder of 2 then indicates that January 1 of 1952 will be Tuesday. Therefore, the slide is moved until Tuesday falls opposite January 1, and it will be found that in the construction according to the invention, January 1952 will be shown in one of the slots 42. If the number of year dates available on the edge of the slider is limited, this formula may be utilized to determine the position of the slider for any year not given on the actual calendar.

While for simplicity of description, the calendar has been shown and described as being flat, it is obvious that both the base and the slider may be curved, or even cylindrical, if desired. Obviously, the width of the device may be readily determined by eliminating columns of weekdays or columns of year dates, as may be desired. If being quite probable that for a pocket calendar only one column of year dates would be used and only one column of weekday would be used. For simplicity of illustration, the leap year date has been shown as shaded as at 50, with the border being shaded and a numeral showing in plain letters. And for the second, or normal, half of the period, the border is shown plain and the shading about the indicia. In normal operation of the device, the slide will be selected to any desired year by means of the handle sliding in the slot 46 until the desired year shows in one of the windows 42. In this position, the calendar is adjusted for that particular year and any date can be readily determined therefrom. For dates not shown in the column of year dates, the formula given above may be utilized to adjust the slide with respect to the numbered portion of the base so that any year calendar may be readily set up.

It will thus be apparent that the present calendar provides a perpetual device which may be used over any number of years or may be utilized as desired to find the particular arrangement of any particular year.

While for simplicity of exemplification a presently preferred embodiment of the invention has been shown and described according to the best present understanding thereof, it will be apparent to those skilled in the art that changes and modifications may be made in the construction and arrangement of the parts thereof without departing from the true spirit and purpose of the invention.

What is claimed as new is as follows:

1. A perpetual calendar comprising a stationary base member, indicia on said base member representing the monthly dates for each month of the year, said indicia being arranged in parallel columns, a movable transparent slide mounted on said base, indicia on said slide consisting in days-of-the-week indications for every monthly date, and additional day-of-the-week indications arranged in columns aligning each day-of-the-week indication with a monthly date during displacement of the slide, said indicia thus positioning a day-of-the-week indication adjacent each of said first mentioned base indicia in every position of the slide, and year indicia on said slide corresponding to the successive years, said year indicia on said slide being arranged in columns of 42 successive years indicia with each leap year being repeated along the day-of-the-week columns and a selector frame for the year indicia including an opaque member overlying said columns of years, and a plurality of window slots through which certain of the years are visible, said slots being spaced at a distance equal to seven indicia spaces of said year columns, said slide being movable through six indicia spaces whereby a given year shows only in a single window slot.

2. The calendar of claim 1 wherein said base member has a plurality of parallel strips, there being three of said columns of indicia on each strip, and said slide being provided with ribs that are fitted in the spaces between said parallel strips.

References Cited in the file of this patent

UNITED STATES PATENTS

| Re. 10,648 | Frost | Sept. 29, 1885 |
| 641,433 | Buell | Jan. 16, 1900 |
| 1,668,280 | Maschmann | May 1, 1928 |
| 1,692,758 | Nogrady | Nov. 20, 1928 |
| 1,705,866 | Johnson | Mar. 16, 1929 |
| 1,711,041 | Carson | Apr. 30, 1929 |
| 2,575,555 | La Plante | Nov. 20, 1951 |
| 2,575,929 | Roesholm | Nov. 20, 1951 |
| 2,584,810 | O'Kane | Feb. 5, 1952 |

FOREIGN PATENTS

| 272,780 | Italy | Mar. 21, 1930 |